July 13, 1937. M. G. VASS 2,086,886
CORNER BEAD AND METHOD OF MANUFACTURING SAME
Filed Feb. 27, 1933 4 Sheets-Sheet 1
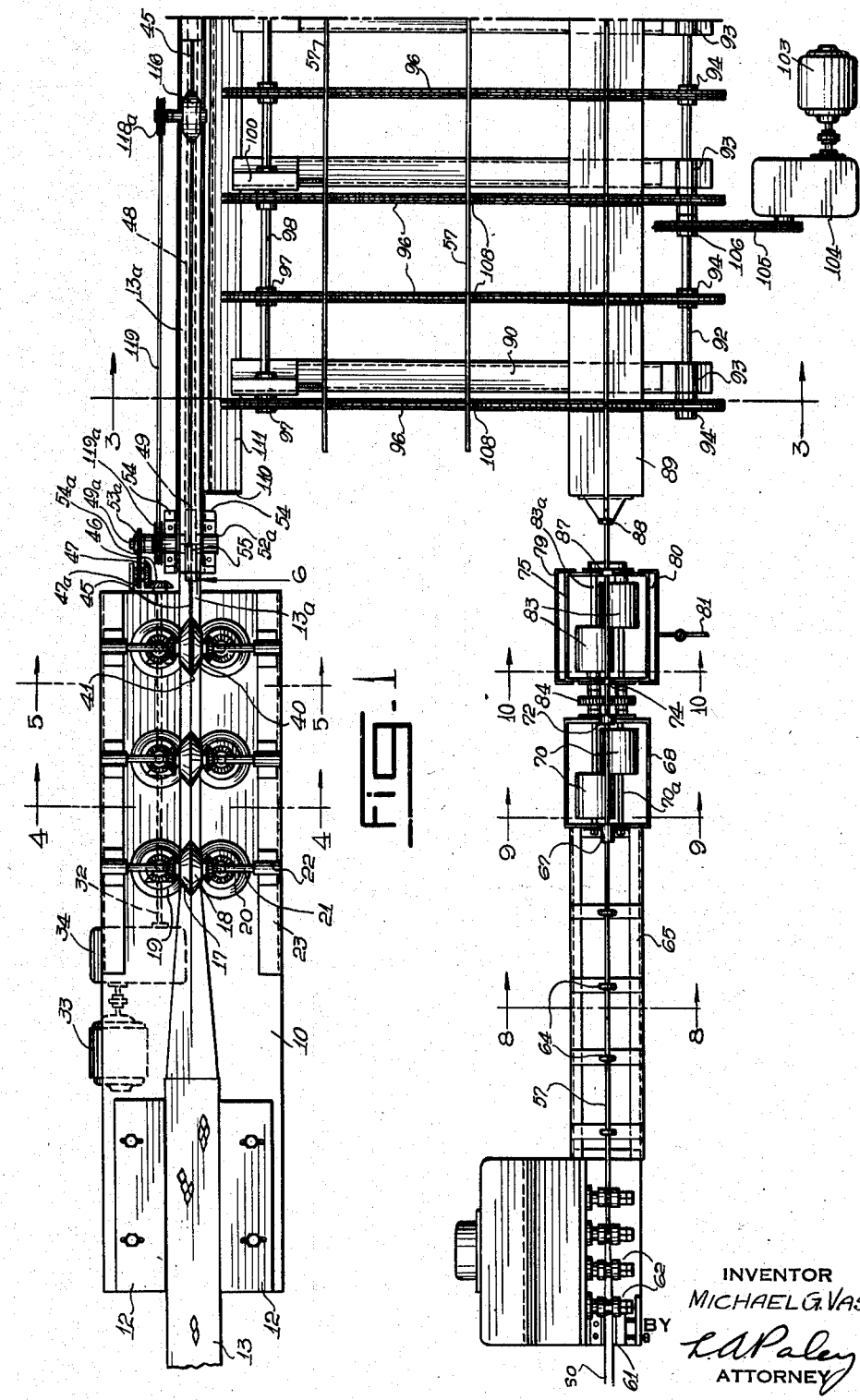
INVENTOR
MICHAEL G. VASS
BY
ATTORNEY

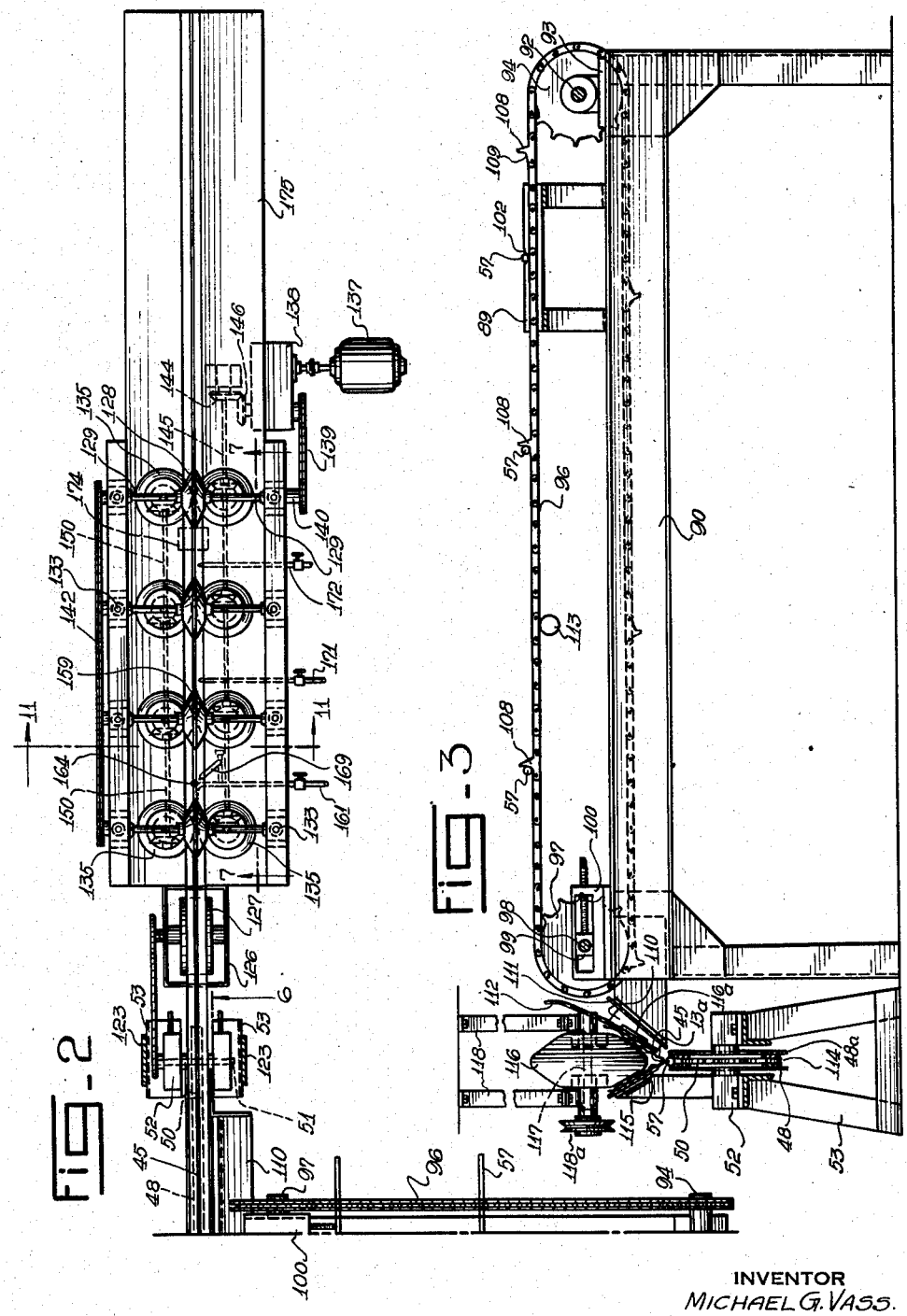

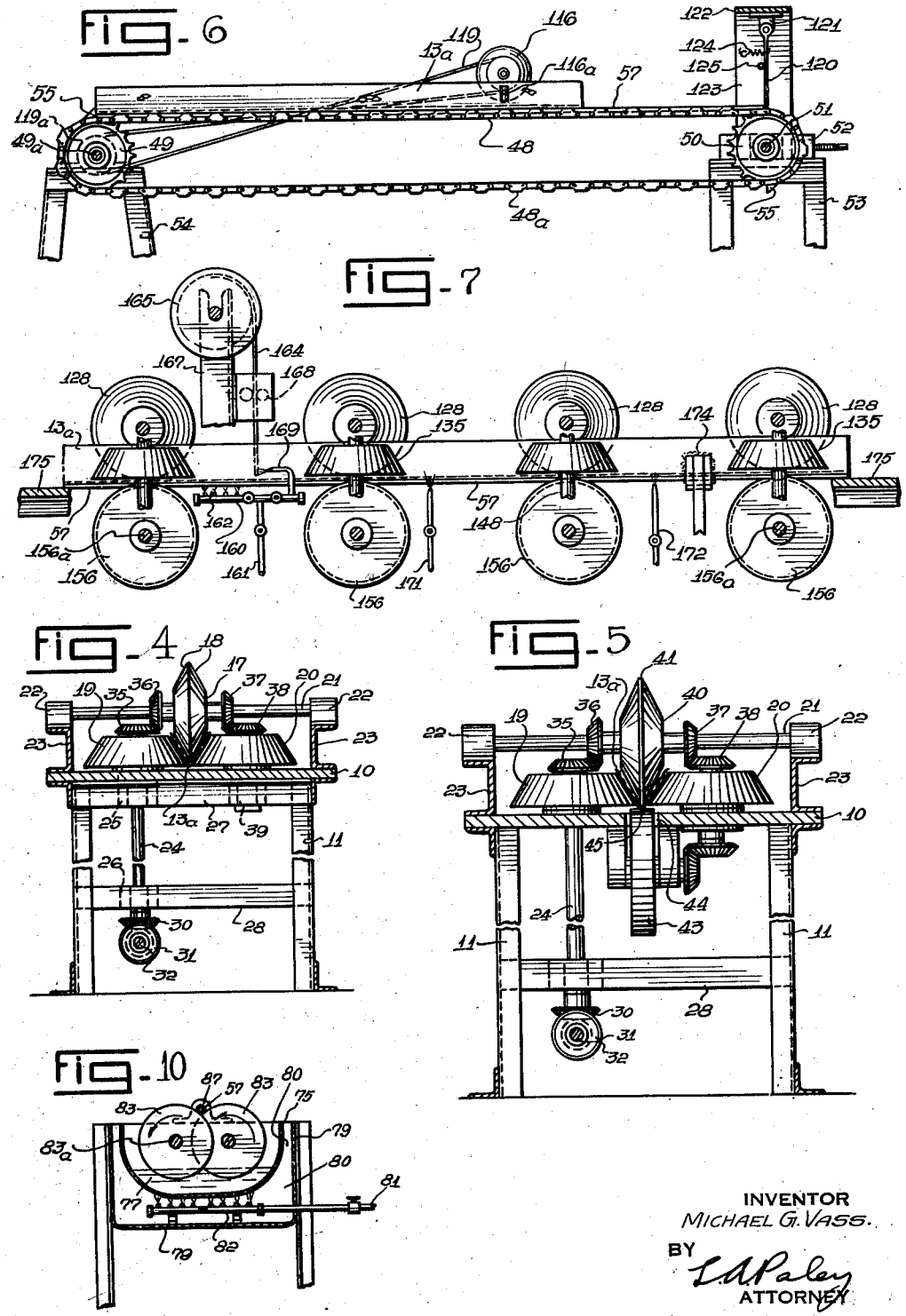

July 13, 1937.  M. G. VASS  2,086,886
CORNER BEAD AND METHOD OF MANUFACTURING SAME
Filed Feb. 27, 1933   4 Sheets-Sheet 4
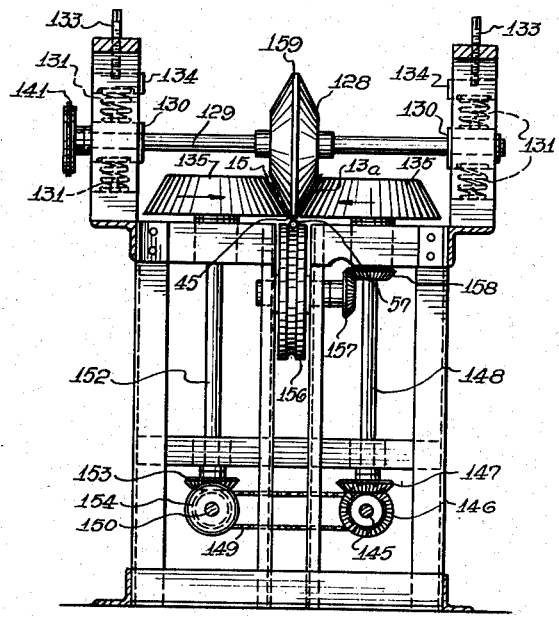
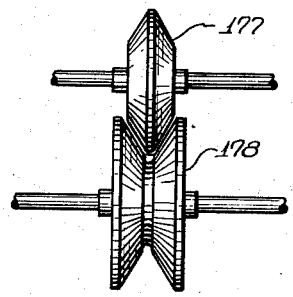
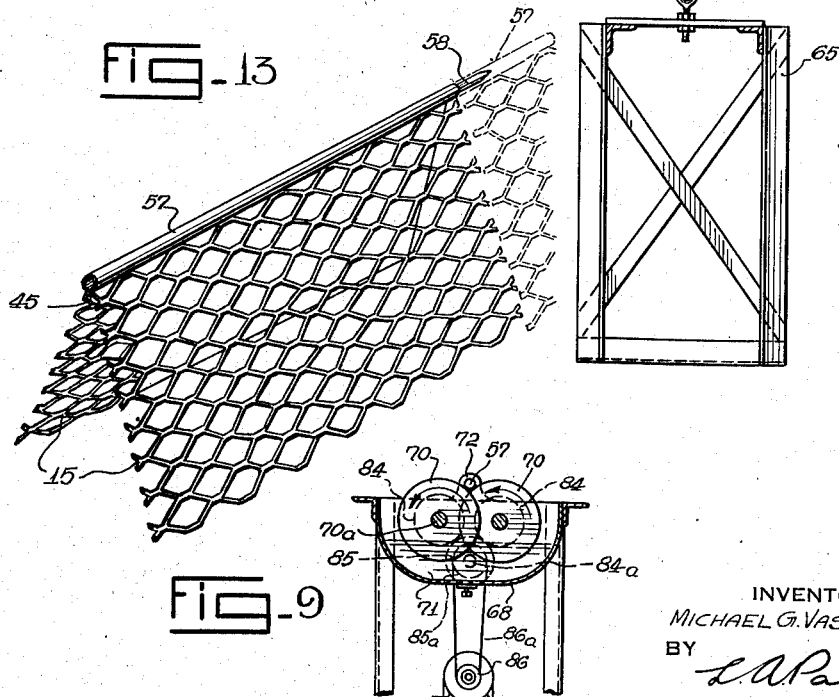
INVENTOR
MICHAEL G. VASS.
BY
ATTORNEY Patented July 13, 1937

2,086,886

UNITED STATES PATENT OFFICE 2,086,886

CORNER BEAD AND METHOD OF MANUFACTURING SAME

Michael G. Vass, Maywood, Ill., assignor to United States Gypsum Company, Chicago, Ill., a corporation of Illinois Application February 27, 1933, Serial No. 658,713

7 Claims. (Cl. 113—112)

This invention relates to metallic reinforcement used in building constructions or the like, and has reference more particularly to metal corner beads to be embedded in plaster at the corners of rooms and the manufacture of the same.

In the manufacture of metal corner beads, it is customary to form the same from a unitary blank, the tubular or other shape nose of the corner bead being formed integral with angular wings of perforated metal. With this type of corner bead, the cost of manufacture is excessive and the bond of the plaster adjacent the usual unexpanded portions of the wings where the same are integrally connected to the nose is sometimes found to be defective. Not only is the cost of manufacturing ordinary types of corner bead relatively high because of the intricate and expensive machinery necessary for their production, but the cost of these corner beads is also necessarily maintained at a high figure because of the amount of metal required for their production. The present invention contemplates the manufacture of a corner bead which will have all the advantages inherent in expanded metal corner beads, while eliminating the undesirable features. To this end a tubular or other shape nosing is attached to the apex of an angular strip of suitable perforated metal, but preferably expanded metal, by suitable means such as soldering.

An object of this invention, therefore, is to provide an improved metallic reinforcement in which a separate nosing is attached to an angular strip.

Another object of the invention is to provide a method of economically manufacturing metallic reinforcements of the type described.

Another object of the invention is the provision of methods and means whereby strips of expanded and unexpanded material are progressively fashioned into the desired shapes and united to form metallic reinforcements.

Another object of the invention is to provide a metallic corner bead in which a separate nosing is soldered to a separate angular wing section; also to improve metallic reinforcements and their manufacture in other respects hereinafter specified and claimed.

Reference is to be had to the accompanying drawings forming a part of this specification, in which Fig. 1 is a plan view of the feed end of an apparatus for carrying out the steps of the invention, Fig. 2 is a continuation of the plan view of Fig. 1 and shows the finishing end of the apparatus, Fig. 3 is a sectional elevation taken on line 3—3 of Fig. 1, and illustrates details of the conveyor means for delivering the nosing sections to the assembly means, Fig. 4 is a sectional elevation taken on line 4—4 of Fig. 1, and shows details of the wing forming compression roll assembly, Fig. 5 is a sectional elevation, taken on line 5—5 of Fig. 1, showing the final pass in the series of wing-forming compression rolls, Fig. 6 is a sectional elevation of the means for assembling the bead and metallic angle, taken on line 6—6 of Figs. 1 and 2, with certain parts removed to simplify the illustration, Fig. 7 is a sectional elevation, with parts broken away, of the means for uniting and ironing the finished corner bead, taken on line 7—7 of Fig. 2.

Fig. 8 is a sectional elevation of guiding means for the tube forming assembly, taken on line 8—8 of Fig. 1, Fig. 9 is a sectional elevation of the fluxing bath, taken on line 9—9 of Fig. 1, Fig. 10 is a sectional elevation of the solder bath for coating the tubing, taken on line 10—10 of Fig. 1, Fig. 11 is a sectional elevation of the finishing or pressure roll assembly, taken on line 11—11 of Fig. 2, Fig. 12 is a fragmentary elevation of a modified form of press roll construction; and Fig. 13 illustrates the type of corner bead which may be fabricated according to the present invention.

In its simplest embodiment, the method of the present invention comprises soldering a nosing, preferably rounded, to the apex of an angular strip of suitable perforated material, such as expanded metal to form a corner bead for use in building construction. The method preferably includes the shaping of flat strips of the perforated material into the desired angularity, the shaping of flat strips of suitable unexpanded metal into tubular form for the nosing, and the uniting of the tubular nosing to the apex of the angular strips. The shaping steps are preferably simultaneous and continuous so that the tubular element and the angular element may be brought together to be united without loss of time.

The preferred form of apparatus for carrying out the described method comprises means for shaping the perforated material into angular form, means for forming the tubular nosing, means for assembling the nosing and angular material, and means for permanently uniting the nosing to the apex of the angular material so as to provide a finished corner bead. The apparatus is preferably constructed so that all the parts operate in properly timed sequence and so that the finished corner bead is rapidly and continuously produced.

The means for pressing the perforated material into angular form comprises a forming roll table 10, supported upon suitable framework 11 (Fig. 4) and having adjustable guide means 12 at one end for guiding a strip of perforated material 13. The strip 13 is fed to a succession of sets of forming rolls to form the strip into a pair of angularly disposed wings 15 (Fig. 13), the number of sets of forming rolls through which the strip must pass to completion of the desired angular shape depending on the rigidity of the material of the strip. Each preliminary set of forming rolls comprises a center forming roll 17 having its periphery tapered toward the center to form bevels 18, and a pair of compression rolls 19 and 20, the peripheries of which are beveled to complement the bevels 18. The degree of bevel will, of course, be governed in each instance by the relative position of the pass which each set of rolls constitutes. Thus, the bevels 18 will be more nearly horizontal in the first pass than in the succeeding pass or passes. Each roll 17 is carried on a shaft 21 journaled in suitable bearings 22 which are mounted on channel strip support members 23, said members 23 being secured along the longitudinal edges of table 10. Each roll 19 is secured to a shaft 24 which is journaled in bearings 25 and 26, said bearings being mounted on cross frame members 27 and 28, respectively. The lower end of shaft 24 has affixed thereto a bevel gear 30 which engages with a similar gear 31 secured to a drive shaft 32, the latter being rotated by motor 33 acting through a speed reducer or transmission 34. A bevel gear 35 is secured to shaft 24 above roll 19, and meshes with bevel gear 36 which is secured to shaft 21, whereby said shaft 21 and roll 17 are rotated upon rotation of shaft 24. Another bevel gear 37 carried by shaft 21 meshes with a bevel gear 38 secured to the upper end of a shaft 39 on which roll 20 is keyed. Thus, a single source of power serves to drive all the rolls in unison. The forming rolls serve not only to press the strip 13 into the desired angularity, but also to draw the same through the successive passes.

The last set of forming rolls through which strip 13 must pass is preferably somewhat modified in order to flatten the apex of the angle formed in said strip so as to provide a seat for the nosing to be attached thereto. By referring to Fig. 5, it will be seen that the periphery of center roll 40 is provided with a flattened surface 41 concentric with the axis of the roll. A pressure roll 43 is rotatably supported under table 10 and extends up through an aperture 44 in said table to contact with the under side of the winged strip 13a as the same passes under roll 40, thereby pressing apex 45 of the strip against the flattened periphery 41 of roll 40 and flattening the apex 45 to facilitate attaching the corner bead nosing thereto, as will become more apparent as the description herein proceeds. While the flattened periphery 41 of roll 40 is illustrated with considerable prominence, it is to be understood that in practice this may actually be no greater than $\frac{1}{16}$ of an inch, more or less, to serve the desired purpose. As the formed wing strip 13a leaves the last set of forming rolls it is urged to the right as viewed in Fig. 1, and means to be hereinafter described are provided to receive the wing strip and move it forwardly. A bevel gear 46 is attached to the end of drive shaft 32 and meshes with a similar gear 47 attached to a sprocket 47a through which power is transmitted for driving a longitudinal, single chain endless conveyer 48 which engages over a pair of spaced sprockets 49 and 50. Sprocket 50 is secured to a shaft 51 journaled in a pair of take-up bearings 52 which are adapted for adjusting the tension of chain 48. Bearings 52 are supported upon suitable framework 53, and shaft 49a, to which sprocket 49 is secured for rotation, is journaled in bearings 52a which are mounted upon framework 54. A sprocket 53a is secured to the end of shaft 49a and a chain 54a engages over sprockets 47a and 53a in driving relation. At suitable intervals lugs 55 are provided on conveyer chain 48 to engage the rear end of winged strip 13a to insure continuous forward movement of the strip.

A nosing 57 for the corner bead is preferably tubular in form so that two coextensive, adjacent sections of corner bead may be joined by connecting means, such as a double pointed pin 58 (Fig. 13). In practice it has been found desirable to provide an inside diameter for the nosing 57 substantially equivalent to the diameter of the body of an eight-penny nail as that is generally the most common size nail used in building construction and therefore convenient for use as described when the head has been removed. Where desired, of course, a solid nosing may be provided, wire of suitable gauge serving well for the purpose.

In the preferred form of apparatus, means are preferably provided for shaping the tubular nosing 57 coincident with the formation of the winged sections 13a. Therefore, blanks 60 of thin, strip sheet metal are fed between suitable guide means 61 to a series of shaping rolls 62 which serve to shape the metal strips 60 into tubular form. The formed tubular sections 57 are pushed one after the other through a series of annular guides 64 which are mounted upon suitable framework 65 and are substantially circular in cross section. Tubes 57 are supported by guides 64 and are prevented from sagging while being directed to a guide 67 mounted on or adjacent flux tank 68. A pair of fluxing rolls 70 dip into fluxing bath 71 and serve to flux the tube sections 57 as said sections ride between said rolls (see Fig. 9), in order to prepare said sections for receiving a coating of solder. The rolls 70 are preferably so positioned that the tube sections 57 are in substantial frictional contact therewith and will be rotated in a direction opposite to the rotation of rolls 70. As seen in Fig. 9, this rotation will be clockwise as the rolls 70 rotate counterclockwise, thus insuring a thorough flux application to said tube sections. Tubes 57 are then directed through a guide 72 on the far edge of tank 68, and through a guide 74 on the edge of a tank 75 (Figs. 1 and 10) which contains liquid solder 77. An exterior casing 79 surrounds tank 75 to provide a heating chamber 80. A gas pipe 81 delivers gas to a burner 82 positioned beneath tank 75 to provide the heat necessary for keeping solder 77 in a molten state. Tubing 57 rides in contact with solder coating rolls 83 in a manner similar to that described in connection with the fluxing operation, whereby said rolls 83, which dip into solder 77, will supply the tubing with a thin, uniform coating of solder. Rolls 70 are preferably positioned in staggered arrangement and are carried by shafts 70a, which are suitably journaled in the ends of tank 68; and rolls 83 are similarly arranged and secured to shafts 83a which are journaled in the ends of tank 75. Shafts 70a and 83a are preferably coaxial and joined together at their adjacent ends in any suitable manner for rotation in unison, but may be joined by means of pins extending through the hubs of a pair of twin gears 84. Gears 84 are rotated counter-clockwise in unison, as viewed in Figs. 9 and 10, by a pinion 85 which is carried by a shaft 84a to which there is secured a pulley 85a which is rotatably driven clockwise by any suitable source of power, such as a motor 86, through a belt 86a.

After receiving the coating of solder, nosing members 57 pass through a guide 87 on the far end of tank 75, and then through a guide 88 on the edge of a sectional delivery table 89 which is supported by a conveyor frame 90, the conveyor being adapted to transfer the nosing members 57 to conveyor chain 48, whereby to bring the nosing members and wing sections 13a into assembled relationship preparatory to uniting the same. A shaft 92 is journaled in suitable bearings 93, which are mounted adjacent the right end of the conveyor frame 90, as viewed in Fig. 3, and carries a plurality of sprocket wheels 94 over which are engaged endless chains 96. At the left hand end of conveyor frame 90, chains 96 are engaged over sprocket wheels 97 secured to a shaft 98 which is journaled in suitable bearings 99 adjustably carried in take-ups 100. The delivery table 89 is preferably sectional, the sections being separated by the chains 96, and the upper surface of table 89 is preferably on a level somewhat above chains 96. A groove 102 is provided longitudinally of table 89 to serve as a guide for receiving the sections 57. A motor 103 operating through a suitable speed reducer 104 and drive chain 105, serves to drive a sprocket wheel 106 which is attached to shaft 92 and thereby rotate said shaft to drive the conveyor chains 96. These chains 96 are provided at intervals with lugs 108 adapted to engage the successive sections of nosing tubing 57 and carry the same out of groove 102 in table 89 to the left, as seen in Fig. 3, to deposit said sections in a chute 110, comprising a slide 111 and a guard or guide 112. Members 111 and 112 may be continuous or sectional, as desired. Chute 110 preferably extends along the entire delivery end of conveyor frame 90 or even somewhat beyond each side of the conveyor frame. Chute 110 serves to direct sections 57 into a bed or channel 114 in chain conveyer 48, said channel 114 being formed by the raised sides 48a of alternate links of chain 48. Suitable means, such as rollers 113, are provided to prevent sagging of chains 96 as the same carry sections of nosing 57 to said chute 110.

Wing section 13a is carried apex downwardly above conveyer chain 48 in a bottomless guideway formed by member 112 and a plate or a series of plates or fingers 115, said members 112 and 115 being inclined toward each other and the channel 114. Apex 45 of section 13a is preferably held out of contact with conveyer 48 sufficiently to permit a nosing section 57 to be deposited from chute 110 into channel 114 under the apex 45. By virtue of the impelling force of the final set of forming rolls, the wing section 13a will be pushed along the guideway formed by members 112 and 115, until the forward end of said wing section is engaged by a friction roll 116, the latter being secured to a shaft 117 rotatably suspended from brackets 118 which are attached to the ceiling or other suitable support. Roll 116 is preferably made of semi-flexible rubber, compressed fiber, or other suitable friction material, and engages the inner faces of the wings 15 of the angular wing section 13a to continue the onward movement of said section after the rear end thereof has left the final forming rolls. A pair of idler rolls 116a are mounted substantially in a plane with members 112 and 115 on each side of section 13a and in engagement with the outer faces of wings 15, whereby to provide a frictionless surface adjacent roll 116 over which section 13a will ride when in contact with roll 116. A sheave or pulley 118a is attached to the end of shaft 117 and is engaged by a drive belt 119, which engages at its other end over a pulley or sheave 119a secured to shaft 49a. In order to allow a sufficient interval between successive wing sections 13a to permit lugs 55 to enter between said sections and engage the rear end of the forwardmost of said sections, the speed of the chain 48 is preferably somewhat greater than the peripheral speed of the wing forming rolls; and roll 116 is made to rotate at a slightly slower rate of speed than conveyer 48 but still faster than the wing forming rolls. Thus, as soon as a wing section 13a is engaged by roll 116, the forward movement of said wing section will be somewhat accelerated and a gap is formed between the end of this wing section and the one following. A lug 55, which is preferably spaced on conveyer chain 48 in timed relationship with the wing section, will then engage the rear end of the wing section to carry the same forward. Roller 116 is preferably freely rotatable counter-clockwise, as viewed in Fig. 6, and suitable ratcheted driving means within or externally of the roll is provided for this purpose, so that after lug 55 has engaged the end of a wing section 13a, the same may be carried forward without impediment. In this way, should lug 55 not immediately engage the end of section 13a, said lug will in short order overtake the wing section inasmuch as roll 116 moves said section forward somewhat more slowly than the travel of conveyer chain 48. In order to operate upon different lengths of wing section from time to time, brackets 118 are preferably removably fastened so that roll 116 may be moved as required. As an alternative a plurality of rolls 116 may be provided to operate upon different lengths of wing section, the rolls not needed for the particular length at the time being manufactured being rendered inoperative.

After a nosing section 57 is delivered to conveyer 48, it is carried forward until the forward end of said nosing section engages a stop 120 pivotally secured to a bracket 121 attached to a cross arm 122, which is supported by standards 123 mounted on framework 53. A hair spring 124, gravity control, or the like, normally holds the stop 120 fast against a stop rod 125, the spring or control 124 being sufficiently resistive to halt the movement of a nosing section 57 until a wing section 13a has been urged by a lug 55 into alignment with said nosing section. The wing and nosing sections are preferably of equal length, so that as the end of the wing section 13a reaches stop 120, lug 55 will engage the opposite end of nosing section 57, and the combined pressure exerted by said lug 55 against the end of the wing section 13a and nosing section 57 will serve to overcome the resistance of the stop-retaining means 124 and thus trip stop 120.

Thereupon the corner bead assembly is pushed toward the right, as viewed in Figs. 2 and 6, toward means for uniting the same.

There is preferably interposed in the path of the corner bead assembly a suitable fluxing means to prepare said bead assembly for soldering. This may comprise a flux tank 126 and a rotary fluxing brush 127 which is rotatably mounted in tank 126 and is adapted to coat the junction of the nosing 57 and apex 45 of wing section 13a preparatory to soldering the nosing to the wing section. Other means such as a flux spray or jet may be employed alone or in combination with brush 127 for this purpose. After passing over the fluxing brush 126, the bead assembly passes in succession through a series of finishing rolls and means for applying heat and solder for uniting the parts of the corner bead. As shown in the drawings, there are provided a plurality of similar central pressure rolls 128 secured to shafts 129 which are journaled in suitable bearings in journal blocks 130, said blocks being supported between suitable compression springs 131. Suitable adjustment means, such as screws 133 and compression heads 134 are provided for regulating the compression of springs 131 and thus the pressure with which rolls 128 will be forced to bear against wing section 13a. This arrangement permits of relatively fine adjustment of the effective pressure exerted by any of the rolls, as may from time to time become desirable. A pair of side pressure rolls 135 engage the outside faces of wings 15 of section 13a to press the same against the center pressure roll 128 whereby to straighten said wings 15. It is very important in practice to have the corner bead just as true as possible.

A motor 137 is connected with speed reducer 138 and supplies power for rotating rolls 128 and rolls 135. A drive chain 139 engages over a sprocket wheel 140 on the end of one of the shafts 129 which carries a roll 128, and each shaft 129 has a sprocket wheel 141 on an end over which an endless chain 142 engages to connect all the shafts 129 for rotation in unison. A bevel gear 144 on a drive shaft 145 engages with transmission gear 146 outside of speed reducer 138 for rotating said shaft 145; and a series of bevel gears 143 engage with bevel gears 147 on shafts 148 to which the right hand rolls 135 (Fig. 11) are keyed for rotation. A chain 149 engages over a suitable sprocket wheel on shaft 145 and one on a shaft 150 to coordinate rotation of said shafts. A shaft 152, to which left hand roll 135 is connected, and which is geared to shaft 150 through a bevel gear 153 which meshes with a gear 154 on said shaft 150, will be driven in unison with shaft 148. A grooved roll 156 is rotatably mounted below each roll 128 and engages nosing 57 to press it firmly against the apex 45 of wing section 13a. These rolls 156 are secured for rotation to shafts 156a which have secured to one end a bevel gear 157 which meshes with a similar gear 158 secured to shaft 148. In this manner, there will be coordinate rotation of all the cooperating finishing rolls 128, 135 and 156. Peripheral apex 159 of rolls 128 is somewhat flattened so as to press the apex 45 of wing section 13a firmly against nosing section 57.

As the corner bead assembly leaves the first set of finishing pressure rolls a gas heater 160, supplied with gas from a pipe 161, impinges a series of flame jets 162 upon the nosing 57 and the apex portion of section 13a whereby to heat the same, and soften the solder on said nosing 57. A strip of solder 164 is fed from a roll 165, which is supported upon suitable standards 167, to a point directly above the desired union line of nosing 57 with apex 45 of wing section 13a. It is desirable to provide a timed impelling means in the form of driven rollers 168 to feed solder 164 as required. A torch 169, supplied with gas from pipe 161, impinges a flame upon the end of strip solder 164 to liquefy the same and allow it to deposit at the line of union between the nosing and wing sections. The soldered corner bead then passes through another set of finishing pressure rolls to further straighten and align the united wing and nosing sections. At this stage, the roll 128 may be in the nature of a Swedish iron, that is, it may be hollow and suitably heated, so as to provide a sweating action to take place between the corner bead elements to insure a proper union of nosing 57 to wing section 13a. An air jet 171 then impinges upon the formed corner bead to chill the solder and prevent the joint from loosening, and after passing through another set of pressure rolls, a mild flame is directed from jet 172 against the corner bead to soften any excess solder or beads that may have formed on the finished product, whereby a wiper or cleaner 174 may remove the same. After passing through the final set or sets of finishing rolls, the finished corner bead is delivered to table 175 for further handling as desired.

Instead of using the sort of finishing pressure roll assembly shown in Fig. 11, in which there is a center pressure roll 128, side or wing pressure rolls 135 and grooved pressure roll 156, there may be substituted a male pressure roll 177 and a female pressure roll 178, of the type illustrated in Fig. 12, to serve the same purpose. Similarly, rolls of this type may be substituted for the sets of wing forming rolls, shown in Figs. 4 and 5.

In operation, a strip, or a succession of strips, of expanded metal 13 is fed to a graduated series of forming rolls mounted upon a suitable work stand or table 10. Said rolls may comprise a center roll 17 and side or wing rolls 19 and 20, or rolls of the type shown in Fig. 12, in which suitable male and female rolls or dies are provided, whereby to form the strips 13 into winged or flange sections 13a having a pair of wings 15. Flattened peripheral apex 41 on roll 40 of the last set of forming rolls, cooperating with pressure roll 43 flattens apex 45 of wing section 13a to provide a good seat for receiving a nosing 57.

Simultaneously with the formation of the winged sections 13a, strips 60 of thin sheet metal are fed to a series of shaping rolls 62 to form said strips into tubular shape to provide nosing sections 57, the sections being carried through guide dies 64 to a fluxing bath 71 where a pair of fluxing rolls 70 operate on the tubes 57 to thoroughly flux the same preparatory to receiving a coating of solder 77 imparted by rolls 83, said rolls dipping into the solder which is carried in a tank 75 set in the path of the onwardly moving nosing sections and is maintained in a liquid state by a gas burner 82. This coating of solder is preferably applied very thinly to the tubes 57, and serves to substantially close the joint formed during manufacture and to prepare the tubing for ready reception of solder 164 applied during the operation of uniting a nosing section 57 to a wing section 13a. The coating of solder also prevents the nosing from uniting when applied in a finished wall. Eventually, the nosing sections 57 are delivered to delivery table 89 on conveyer frame 90, where each section 57 in succession is engaged by lugs 108 on a plurality of spaced conveyer chains 96. Chains 96 travel in a plane slightly below the bottom of the groove 102 in which the sections 57 travel onto table 89, whereby the transverse movement of the sections 57 onto said table is not impeded and each individual section 57 will be completely in position on the table 89 before lugs 108 engage the same.

A friction roll 116 engages wing sections 13a after said sections have passed out from under the final forming roll 40 and somewhat accelerates the movement thereof so that a gap will be formed between successive sections 13a to permit a lug 55 on conveyer chain 48 to engage the rear end of the section to continue the forward movement of said section along a trough-like guideway having sides 112 and 115. Said guideway extends coincident with a longitudinal, single chain conveyer 48 provided with a groove 114 into which nosing sections 57 are deposited from chute 110 as said sections are delivered by conveyer 90. The nosing sections 57 are carried forward by the conveyer 48 and wing sections 13a are urged forward by lugs 55 on the conveyer 48, until said wing and nosing sections are aligned against suitable stop means 120, which prevents forward movement beyond a certain point of a nosing section 57 until alignment of the end thereof with the end of a wing section 13a is secured, whereupon said stop 120 is tripped and the corner bead assembly is carried forward to pass over tank 126 containing a fluxing bath which is applied to the corner bead assembly by a rotary brush 127 or other suitable means. The corner bead assembly, comprising nosing section 57 and wing section 13a, then passes through a gang of finishing pressure rolls comprising center roll 128, wing rolls 135, and lower pressure roll 156. Intermediate the preliminary and following pass through the finishing rolls heat is applied to the nosing 57 and apex 45 of wing section 13a by gas jets 162 to put the bead assembly into proper condition for receiving solder 164 to unite the wing and nosing sections. The uniting action is completed by the next pass through the finishing rolls, in which roll 128 may be heated to sweat together the nosing and wing sections. As the completed corner bead travels on through the final passes of the finishing rolls, an air jet delivered from a pipe 171 chills the solder which has been liquefied by the sweating action, the solder is partially fused again by gas jet 172 and a wiper 174 cleans off excess solder. The finished corner bead is delivered to a suitable table 175, which may be an extension of the finishing roll table, as shown.

It should be observed that with only slight changes the apparatus described is adaptable to form and unite nosing sections other than tubular or round. Moreover, while the illustrated embodiment of the invention shows the nosing 57 being united to the downwardly extending apex 45 of wing section 13a, it should be understood that the reverse arrangement or a sidewise arrangement may be adopted where desired.

It is apparent that my invention provides an improved corner bead which is economical and simple to manufacture and which is suitable for all uses to which known types of corner beads are adapted. In addition, the corner bead of my invention lends itself very readily to the formation of arched effects by merely severing the wings 15 transversely to adjacent the nosing 57 whereby the nosing may be bent to any desired angle. This feature also finds particular applicability where two corners requiring corner bead converge, where, with my improved corner bead, it is only necessary to sever the wings 15 as described and bend nosing 15 to the required angularity, thus providing a continuous connection which will prevent a crack from forming at the corner convergence.

Wherever the term "sweating" is used in the following claims, it should be construed as including either the narrow significance of the term or the operation of soldering together broadly.

In conclusion, it should be understood that while the illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. A corner bead comprising a strip of expanded metal bent longitudinally to angular form to provide a pair of wings, the apex of the angle thus formed being flattened, and a tubular nosing soldered to said flattened angle, said nosing providing means whereby to receive a connecting pin to connect coextensive, adjacent sections of corner bead.

2. A corner bead comprising reticulate, metallic wings and a separately formed nosing member, said wings and nosing member being joined by soldering, said nosing member being formed to provide means for receiving a connecting member to connect adjacent sections of corner bead.

3. A corner bead comprising a strip of foraminous metal bent longitudinally to angular shape to form a pair of wings, a tubular nosing positioned adjacent the apex of said wings, and a layer of solder joining said nosing to said apex and completely enveloping said nosing so as to provide a rust preventative coating for said nosing when said nosing is exposed at the corner of a plastered room.

4. A corner bead comprising reticulate, connected metallic wings and a separately formed nosing member joined thereto by soldering, said nosing being coated with solder to render it rust-resisting.

5. A corner bead comprising a strip of expanded metal bent longitudinally to angular form to provide a pair of wings, and a nosing member joined thereto by soldering, said nosing member being coated with solder to render it rust-resisting.

6. The method of making a rust-resistant corner bead which comprises the steps of shaping a flat strip of perforated metal into an angular strip having divergently extending wings, coating a nosing member with solder, and soldering the latter to the apex of the angle of the strip.

7. The method of making a rust-resistant corner bead which comprises the steps of shaping a strip of expanded metal into an angular strip having divergently extending wings, coating a nosing member with solder, and soldering the latter to the apex of the angle of the strip.

MICHAEL G. VASS.